(12) United States Patent
Hann

(10) Patent No.: US 6,296,316 B1
(45) Date of Patent: Oct. 2, 2001

(54) ADJUSTABLE HEADREST GUIDE

(75) Inventor: Mark S. Hann, Shorewood, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/452,667

(22) Filed: Dec. 1, 1999

(51) Int. Cl.[7] .................................................. A47C 7/38
(52) U.S. Cl. .................... 297/463.1; 297/391; 297/404; 411/119; 411/120
(58) Field of Search ............................... 297/463.1, 463.2, 297/404, 391, 397; 411/120, 119; 403/290

(56) References Cited

U.S. PATENT DOCUMENTS

| | | | |
|---|---|---|---|
| 137,919 | * | 4/1873 | Hays . |
| 470,973 | * | 3/1892 | Bissell . |
| 655,704 | * | 8/1900 | Gage . |
| 1,353,382 | * | 9/1920 | Crissinger . |
| 4,427,233 | * | 1/1984 | Matumoto ............................ 297/391 |
| 4,489,979 | | 12/1984 | Zyngier ................................ 297/391 |
| 4,585,367 | | 4/1986 | Gall ...................................... 403/104 |
| 4,673,214 | | 6/1987 | Meiller ............................ 297/404 X |
| 4,844,545 | | 7/1989 | Ishii .................................. 297/391 X |
| 4,854,642 | * | 8/1989 | Vidwans et al. ................. 297/391 X |
| 5,110,158 | * | 5/1992 | Sabo et al. ........................ 411/225 X |
| 5,445,434 | | 8/1995 | Kohut ...................................... 297/391 |
| 5,667,276 | | 9/1997 | Connelly et al. ............. 297/463.1 X |
| 5,769,499 | | 6/1998 | Dudash et al. .................... 297/391 X |
| 5,788,250 | | 8/1998 | Masters et al. ................... 297/391 X |
| 5,816,658 | * | 10/1998 | Wallis .............................. 297/391 X |
| 5,823,623 | | 10/1998 | Beck ....................................... 297/410 |
| 5,860,703 | * | 1/1999 | Courtois et al. ................. 297/404 X |
| 5,927,813 | * | 7/1999 | Nemoto ......................... 297/463.1 X |
| 5,992,939 | * | 11/1999 | Gass et al. ......................... 297/463.1 |

FOREIGN PATENT DOCUMENTS

3301073 A1 * 7/1984 (DE) .................................... 297/391

* cited by examiner

Primary Examiner—Peter M. Cuomo
Assistant Examiner—Rodney B. White
(74) Attorney, Agent, or Firm—Pauley Petersen Kinne & Fejer

(57) ABSTRACT

A headrest guide for receiving a headrest rod including a collet having an adjustable inner diameter positioned within a sleeve. A lock member for maintaining a constant inner diameter of the collet is engaged once the inner diameter of the collet is properly sized relative to the headrest rod. A method for fitting the headrest guide with the headrest rod includes sizing the inner diameter of the collet and then molding additional headrest guides so that the lock member is only functional when the inner diameter is at the desired size or within the desired range of sizes.

16 Claims, 2 Drawing Sheets

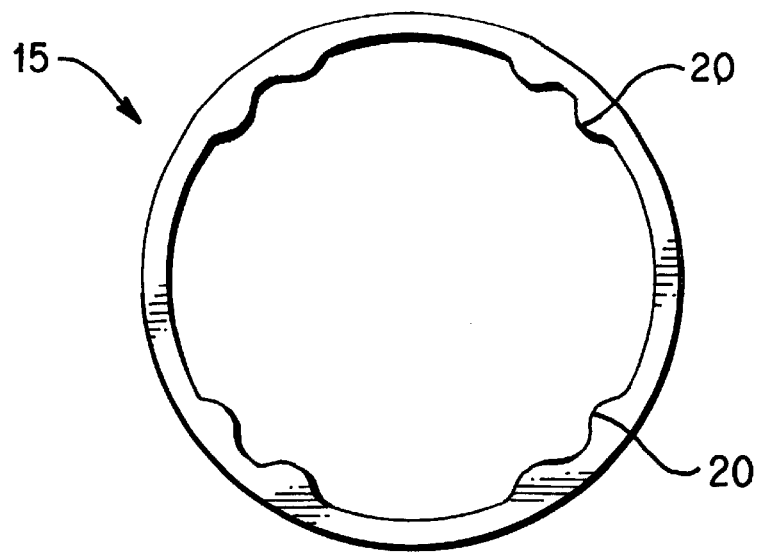
FIG. 1
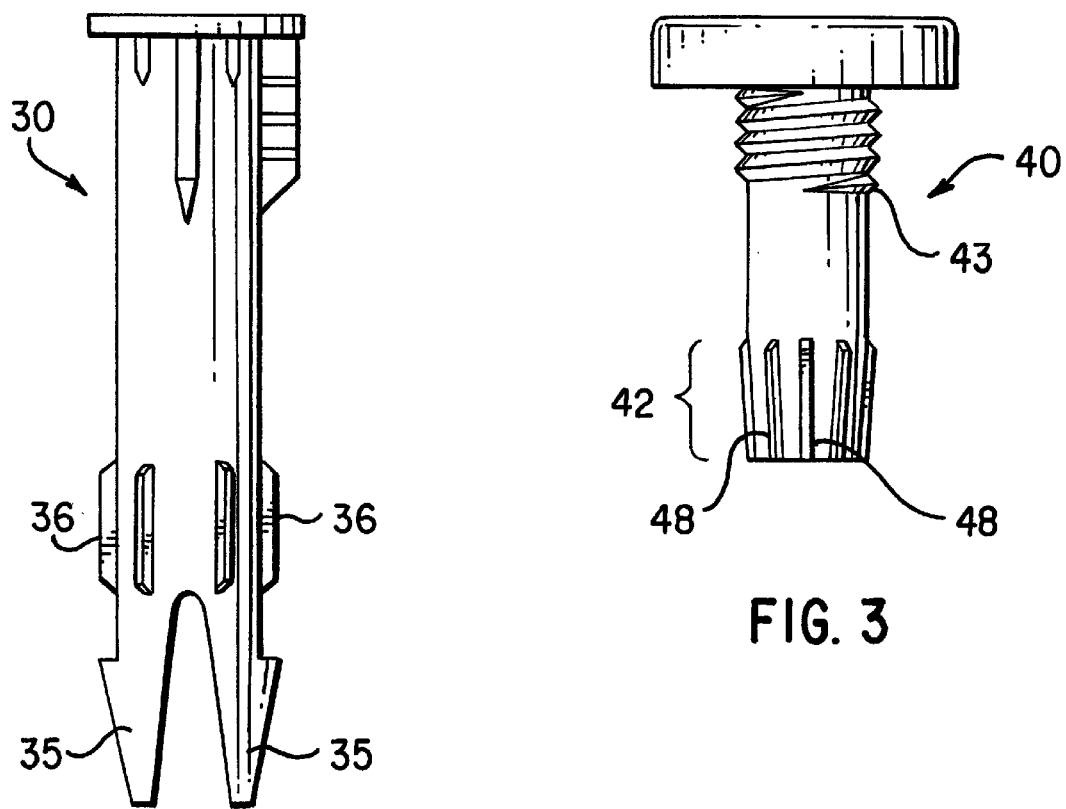
FIG. 2
FIG. 3

ADJUSTABLE HEADREST GUIDE

BACKGROUND OF THE INVENTION

1. Field of the Invention

This invention relates to a headrest guide that permits adjustment of an inner diameter across a range of inner diameters using a collet and sleeve arrangement.

2. Description of Related Art

Automobiles and other vehicles typically include headrests located on the seatbacks to support and/or brace the head and neck of the passenger. Headrests are generally adjustable to accommodate passengers of different heights and body types. An important factor in adjustability of the height of headrests are the efforts required to move the headrest between vertical positions.

In general, headrests have supporting headrest rods that are slideably adjustable within headrest guides positioned in the seat. It is common for the configuration of the headrests and the headrest rods to vary from vehicle to vehicle. As a result, many different embodiments of the headrest guides, each having a different inner diameter to accommodate different diameters of headrest rods, are typically required in order to maintain the desired efforts of movement between vertical positions.

According to one prior art headrest guide, a plurality of crush ribs are positioned along an inner surface of the headrest guide. When a different sized headrest rod is used in connection with the headrest guide, the crush ribs must be sized larger or smaller by adding or removing steel within the corresponding mold. Such a procedure is expensive and time consuming.

Therefore, there is a need for a headrest guide having an adjustable range of inner diameters to accommodate many different headrest rods for different vehicle makes and models while using a single headrest guide design and/or mold.

SUMMARY OF THE INVENTION

A headrest guide according to one preferred embodiment of this invention comprises a sleeve and a collet having an adjustable inner diameter. The collet may be threadably engaged with the sleeve to permit adjustment of the inner diameter of the collet. Accordingly, as the collet descends into the sleeve, an end portion of the collet is compressed through a tapered surface within the sleeve, thus reducing the inner diameter of the collet.

The headrest guide may further comprise a lock member for maintaining the inner diameter constant within the collet. Preferably, the lock member fixes a rotational position of the sleeve relative to the collet. The lock member may comprise a plurality of circumferential openings positioned in the sleeve and a pin or other securing means positioned with respect to the collet. The pin is selectably engageable with a corresponding opening within the sleeve. When the collet is adjusted to the desired position, and thus the desired inner diameter within the sleeve, the pin is inserted into the corresponding opening thus fixing the position of the collet with respect to sleeve. The lock member may alternatively comprise a similarly arranged plurality of teeth and a detente.

In a method of fitting headrest guides to a particular headrest application, a headrest rod is inserted into the headrest guide. The collet is rotatably adjusted within the sleeve until the inner diameter is appropriately sized around the headrest rod. Once the inner diameter is of the desired size, the lock member is engaged to fix the position of the collet relative to the sleeve. Once the correct size of the inner diameter is known, the headrest guide can be molded so that the lock member will only fix the collet with respect to the sleeve for a single inner diameter or within a small range of inner diameters.

It is one object of this invention to provide a headrest guide having an adjustable inner diameter.

It is another object of this invention to provide a headrest guide having a collet and a sleeve in rotatable engagement with one another.

It is still another object of this invention to provide a headrest guide that may be used across a range of differently sized headrest rods.

It is yet another object of this invention to provide a headrest guide that is lockable into a fixed inner diameter.

BRIEF DESCRIPTION OF THE DRAWINGS

The above-mentioned and other features and objects of this invention will be better understood from the following detailed description taken in conjunction with the drawings wherein:

FIG. 1 is a top view of a headrest guide according to the prior art;

FIG. 2 is a side view of a sleeve according to one preferred embodiment of this invention;

FIG. 3 is a side view of a collet according to one preferred embodiment of this invention;

DESCRIPTION OF PREFERRED EMBODIMENTS

Headrests are traditionally slideably connected with respect to a vehicle seat and typically consist of a headrest body, at least one headrest rod for support and a headrest guide positioned within the seat. The headrest rod typically slides with respect to the headrest guide to permit vertical adjustment of the headrest.

Variability in the diameter ofthe headrest rod typically requires separate headrest guides for each diameter of the headrest rod. As shown in FIG. 1, one typical embodiment of a headrest guide includes axial crush ribs 20 that extend along the length of the headrest guide. Headrest guides having such crush ribs 20 may function with the appropriate sliding efforts across a headrest rod diameter range of approximately ±0.005". If headrest rods having a larger diameter are inserted, the headrest becomes very difficult to slide and if headrest rods having a smaller diameter are inserted, excess radial movement may be introduced into the headrests. Therefore, for a headrest guide similar to that shown in FIG. 1, many different molds are required to produce headrest guides that effectively engage with a range of headrest rod diameters.

Figure 4:
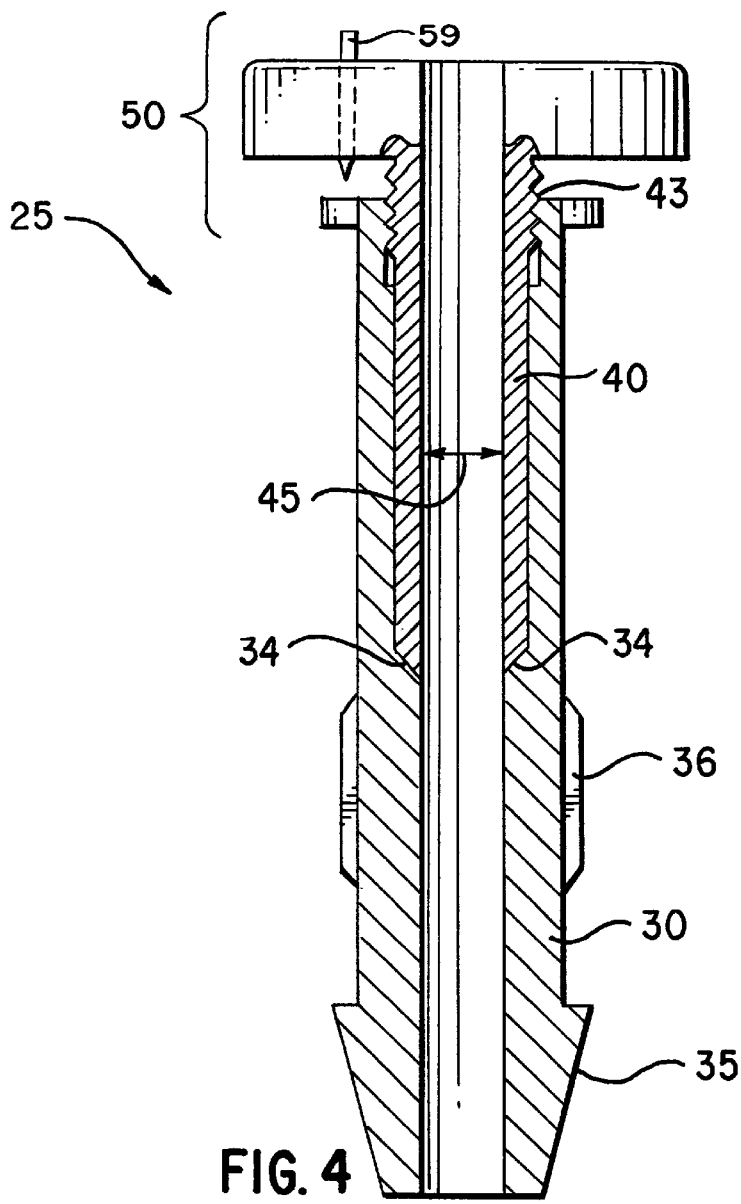
FIG. 4 is a sectional side view of a headrest guide according to one preferred embodiment of this invention.

As shown in FIGS. 2–4, headrest guide 25 according to one preferred embodiment of this invention comprises sleeve 30 and collet 40. Collet 40 is preferably positioned within sleeve 30 resulting in an adjustable inner diameter 45 of collet 40. According to one preferred embodiment of this invention, inner diameter 45 of collet 40 is adjustable across a range of 0.030".

Headrest guide 25 according to one preferred embodiment of this invention is injection molded or otherwise formed from a mold or molds. Headrest guide 25 is preferably molded from a thermoplastic material having appropriate strength and rigidity for an automotive application.

As shown in FIGS. 3 and 4, threads 43 may be positioned in collet 40 and sleeve 30 to permit adjustment of inner diameter 45 of collet 40. Collet 40 is preferably threadably engaged with respect to sleeve 30 so that as collet 40 is screwed into sleeve 30, inner diameter 45 of collet 40 is reduced. According to one preferred embodiment of this invention, as collet 40 descends into sleeve 30, end portion 42 of collet 40 is compressed through tapered surface 34 within sleeve 30, thus resulting in a reduction in inner diameter 45.

According to one preferred embodiment of this invention, shown in FIG. 3, collet 40 includes a plurality of collapsible fingers 48 forming inner diameter 45. Alternatively, collet 40 may form a split collar or any other arrangement known to those having ordinary skill in the art that permits an adjustable inner diameter 45.

According to one preferred embodiment of this invention, head 38 is positioned with respect to collet 40, thereby permitting manual adjustment of collet 40 with respect to sleeve 30.

Figure 5:
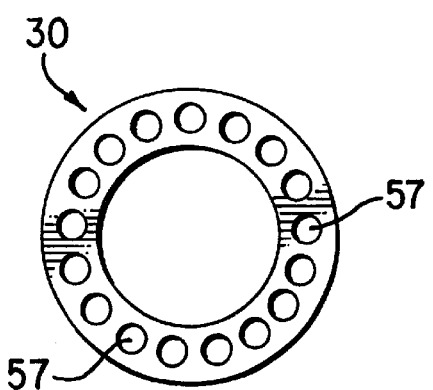
FIG. 5 is a top view of a sleeve having a plurality of circumferential openings ac to one preferred embodiment of this invention.
Figure 6:
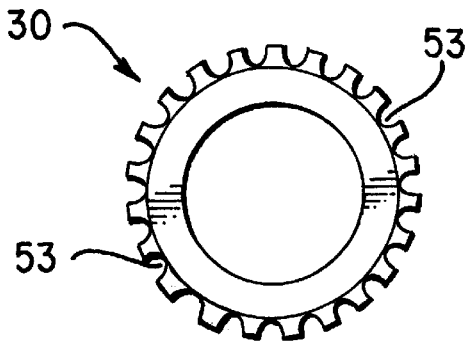
FIG. 6 is a top view of a collet having a plurality of teeth according to one preferred embodiment of this invention.

As shown in FIGS. 4–6, according to one preferred embodiment, headrest guide 25 further comprises lock member 50, also referred to as lock herein 50 for maintaining inner diameter 45 constant within collet 40. Preferably, lock member 50 fixes a rotational position of sleeve 30 relative to collet 40. Therefore, when the desired inner diameter 45 is obtained within collet 40, lock member 50 is engaged to lock inner diameter 45 into a constant diameter.

According to one preferred embodiment of this invention shown in FIG. 5, lock member 50 comprises a plurality of circumferential openings 57 positioned in sleeve 30. Pin 59 or other securing means is preferably positioned with respect to collet 40 and is selectably engageable with corresponding opening 57 within sleeve 40. When collet 40 is adjusted to the desired position, and thus desired inner diameter 45 within sleeve, pin 59 is inserted into corresponding opening thus fixing the position of collet 40 with respect to sleeve 30.

According to another preferred embodiment of this invention shown in FIG. 6, lock member 50 comprises a plurality of teeth 53 formed with respect to sleeve 30. Detente (not shown) is preferably formed with respect to collet 40. Detente is selectably engageable with at least one tooth of the plurality of teeth 53. Lock member 50 may alternatively include other arrangements known to those having ordinary skill in the art.

Sleeve 30 preferably further comprises a retention flange 35 for anchoring headrest guide 25 with respect to a seatback, such as within a welded steel tube (not shown). Additionally, ribs 36 may be positioned around an outer surface of sleeve 30, as shown in FIG. 2, to assist in securely anchoring headrest guide 25 with respect to seatback.

According to one preferred method of fitting headrest guides 25 to a particular headrest application, a headrest rod is inserted into headrest guide 25. Collet 40 is rotatably adjusted within sleeve 30 until inner diameter 45 is appropriately sized around the headrest rod. Once inner diameter 45 is of the desired size, lock member 50 is engaged to fix the position of collet 40 relative to sleeve 30. Each other headrest guide 25 within the same headrest application can then be set in the same matter.

Alternatively, headrest guide 25 can be molded so that lock member 50 will only fix collet 40 with respect to sleeve 30 for a single inner diameter 45 or within a small range of inner diameters 45. This may be accomplished according to one preferred embodiment of this invention by molding only the desired circumferential opening or small range of openings 57 within sleeve 30. In another preferred embodiment of this invention, only the desired tooth or small range of teeth 53 may be molded within sleeve 30.

Therefore, according to the method and apparatus of this invention, a single headrest guide 25 and corresponding tool can be used across a whole range of headrest applications. For larger headrest rods, inner diameter 45 can be configured larger and for smaller headrest rods, inner diameter 45 can be configured correspondingly smaller.

While in the foregoing specification this invention has been described in relation to certain preferred embodiments thereof, and many details have been set forth for purpose of illustration, it will be apparent to those skilled in the art that the headrest guide according to this invention is susceptible to additional embodiments and that certain of the details described herein can be varied considerably without departing from the basic principles of the invention.

I claim:

1. A headrest guide comprising:

a sleeve;

a collet having an adjustable inner diameter, the collet positioned within the sleeve and threadably engaged with respect to the sleeve; and a lock for fixing the adjustable inner diameter of the collet.

2. The headrest guide of claim 1 wherein the lock comprises:

a plurality of circumferential openings positioned in the sleeve; and a pin positioned with respect to the collet, the pin selectably engageable with at least one of the plurality of circumferential openings.

3. The headrest guide of claim 1 wherein the lock comprises:

a plurality of teeth formed with respect to the sleeve; and a detente positioned with respect to the collet, the detente selectably engageable with at least one tooth of the plurality of teeth.

4. The headrest guide of claim 1 wherein the inner diameter of the collet is adjustable across a range of 0.030".

5. A headrest guide for accepting at least one headrest rod, the headrest guide comprising a collet positioned within a sleeve, the collet having an adjustable inner diameter corresponding with an outer diameter of the headrest rod; and a lock for locking the adjustable diameter into a fixed position, the lock including a pin positioned with respect to the collet for locking the collet relative to the sleeve.

6. A headrest guide for receiving a headrest support rod comprising:

a sleeve;

a collet engaged with the sleeve, the collet having a plurality of collapsible fingers forming an inner diameter; and a threaded connection between the collet and the sleeve for adjusting the inner diameter.

7. The headrest guide of claim 6 wherein the inner diameter is adjustable across a range of 0.030".

8. The headrest guide of claim 6 further comprising a lock for fixing the position of the sleeve relative to the collet.

9. The headrest guide of claim 6 further comprising a head connected with respect to the collet, the head permitting manual adjustment of the collet with respect to the sleeve.

10. The headrest guide of claim 6 further comprising:
a small range of circumferential openings positioned within the sleeve.

11. The headrest guide of claim 6 further comprising:
a small range of teeth positioned within the sleeve.

12. A method for fitting a headrest guide with a headrest rod, the method comprising:
inserting the headrest rod into the headrest guide;
adjusting the headrest guide by rotatably engaging a collet with respect to a sleeve;
molding the headrest guide so that the collet may only be locked at a predetermined position of the collet relative to the sleeve;
sizing an inner diameter of the collet to fit the headrest rod;
locking the collet with respect to the sleeve; and
forming a small range of circumferential openings within the sleeve.

13. The method of claim 12 further comprising: threading a threaded connection between the collet and the sleeve for adjusting the inner diameter.

14. A headrest guide comprising:
a sleeve;
a collet having an adjustable inner diameter, the collet positioned within the sleeve;
a lock for fixing the adjustable inner diameter of the collet, the lock including a plurality of circumferential openings positioned in the sleeve and a pin positioned with respect to the collet, the pin selectably engageable with at least one of the plurality of circumferential openings.

15. A headrest guide comprising:
a sleeve;
a collet having an adjustable inner diameter, the collet positioned within the sleeve; and
a lock for fixing the adjustable inner diameter of the collet, wherein the lock includes a plurality of teeth formed with respect to the sleeve and a detente positioned with respect to the collet, the detente selectably engageable with at least one tooth of the plurality of teeth.

16. A method for fitting a headrest guide with a headrest rod, the method comprising:
inserting the headrest rod into the headrest guide;
adjusting the headrest guide by rotatably engaging a collet with respect to a sleeve;
molding the headrest guide so that the collet may only be locked at a predetermined position of the collet relative to the sleeve;
sizing an inner diameter of the collet to fit the headrest rod;
locking the collet with respect to the sleeve; and
forming a small range of teeth within the sleeve.

* * * * *